(12) United States Patent
Sakai et al.

(10) Patent No.: US 9,315,751 B2
(45) Date of Patent: Apr. 19, 2016

(54) GRAVITATIONAL SETTLING TANK AND METHOD FOR PRODUCING ASH-FREE COAL

(75) Inventors: Koji Sakai, Takasago (JP); Takahiro Shishido, Takasago (JP); Noriyuki Okuyama, Takasago (JP); Maki Hamaguchi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 217 days.

(21) Appl. No.: 14/123,887

(22) PCT Filed: Jun. 22, 2012

(86) PCT No.: PCT/JP2012/066043
§ 371 (c)(1),
(2), (4) Date: Dec. 4, 2013

(87) PCT Pub. No.: WO2012/176893
PCT Pub. Date: Dec. 27, 2012

(65) Prior Publication Data
US 2014/0115957 A1    May 1, 2014

(30) Foreign Application Priority Data
Jun. 22, 2011  (JP) ................. 2011-138094

(51) Int. Cl.
*B01D 21/02*    (2006.01)
*C10L 9/10*    (2006.01)
*C10L 9/02*    (2006.01)
*B01D 21/24*    (2006.01)

(52) U.S. Cl.
CPC .............. *C10L 9/10* (2013.01); *B01D 21/2405* (2013.01); *B01D 21/2416* (2013.01); *B01D 21/2427* (2013.01); *C10L 9/02* (2013.01)

(58) Field of Classification Search
CPC ......... C10L 9/10; C10L 9/02; B01D 21/2427; B01D 21/2416; B01D 21/2405
See application file for complete search history.

(56) References Cited

U.S. PATENT DOCUMENTS 5,833,865 A * 11/1998 Harato ................. B01D 21/01
210/207
6,902,667 B1 * 6/2005 Dunne .................... C02F 1/302
210/173

FOREIGN PATENT DOCUMENTS

| CN | 201098612 Y | 8/2008 |
| JP | 62 269719 | 11/1987 |
| JP | 7 60009 | 3/1995 |

(Continued)

OTHER PUBLICATIONS

Written Opinion of the International Searching Authority Issued Jul. 31, 2012 in PCT/JP12/066043 Filed Jun. 22, 2012.

(Continued)

*Primary Examiner* — Cephia D Toomer
(74) *Attorney, Agent, or Firm* — Oblon, McClelland, Maier & Neustadt, L.L.P.

(57) ABSTRACT

A gravitational settling tank including a pressure vessel which precipitates solid content contained in slurry in which coal and solvent are blended, and separates the solid-content concentrated liquid from the supernatant liquid, and a supply pipe which supplies the pressure vessel with the slurry. A main body part and a nozzle part which is connected on the downstream side of the main body part and extends horizontally are provided in the supply pipe. A plurality of holes are provided in the nozzle part. By virtue of this, agitation of the solid-content concentrated liquid which has settled in the bottom is inhibited.

4 Claims, 5 Drawing Sheets

(56) References Cited

FOREIGN PATENT DOCUMENTS

| | | |
|---|---|---|
| JP | 2007 735 | 1/2007 |
| JP | 2009 214000 | 9/2009 |
| JP | 2009 227718 | 10/2009 |

OTHER PUBLICATIONS

International Search Report Issued Jul. 31, 2012 in PCT/JP12/066043 Filed Jun. 22, 2012.

* cited by examiner (a)

(b)

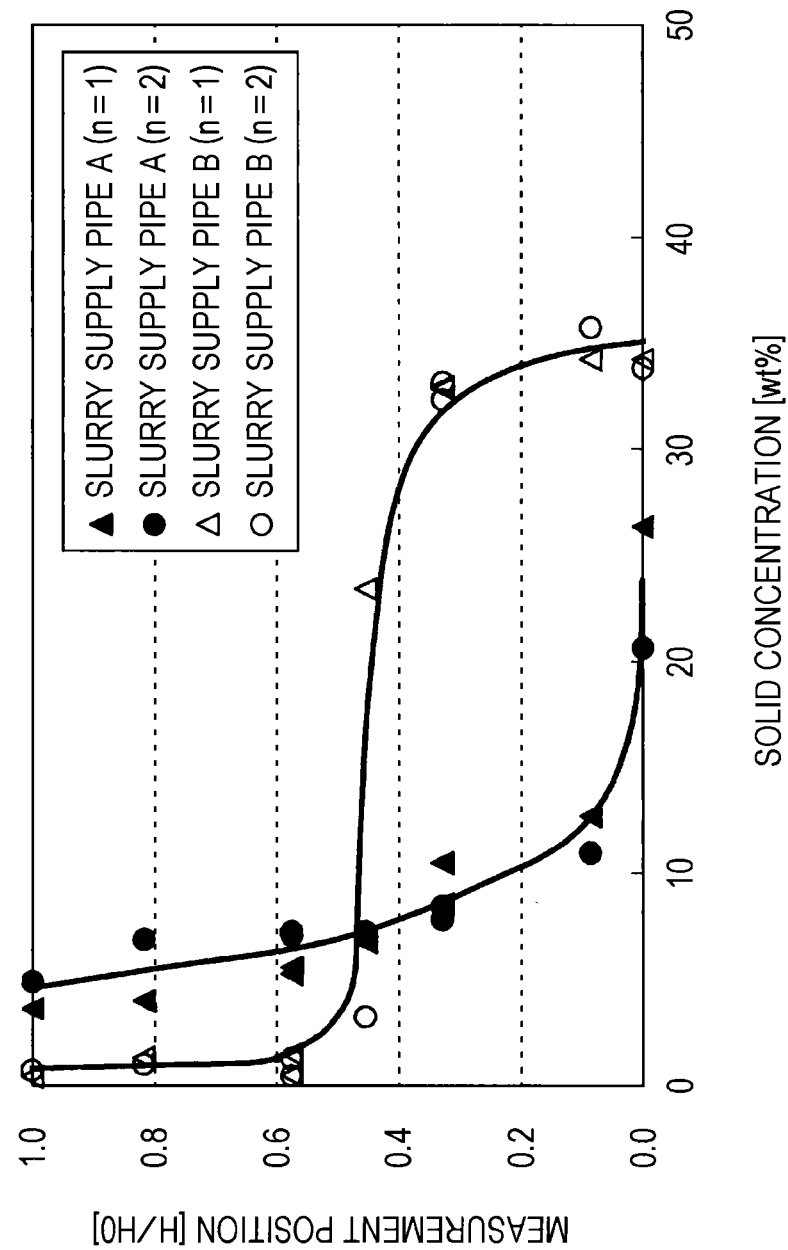

GRAVITATIONAL SETTLING TANK AND METHOD FOR PRODUCING ASH-FREE COAL

TECHNICAL FIELD

The present invention relates to a gravitational settling tank configured to allow a slurry containing coal and a solvent to be separated into a solid-content concentrated liquid and a supernatant liquid, and a method for producing ash-free coal in which ash is removed from coal.

BACKGROUND ART

Coal has been extensively used as a fuel for thermal power generation and boilers or a raw material for chemicals. As one of the environmental measures, there has been a strong demand for the development of a technique for efficiently removing ash in coal. For example, in a high-efficiency hybrid power system using gas turbine combustion, an attempt has been made to use ash-free coal, in which ash is removed, as an alternative fuel to a liquid fuel, such as LNG.

In a known method as a method for producing ash-free coal (for example, PTL 1), a slurry prepared by mixing coal and a solvent is heated to extract a coal component soluble in the solvent (hereinafter, referred to as a "soluble component in the solvent). A supernatant liquid containing the soluble component in the solvent and a solid-content concentrated liquid containing a coal component, such as ash, which is insoluble in the solvent (hereinafter, referred to as an "insoluble component in the solvent") are separated. Separating the solvent from the supernatant liquid provides ash-free coal.

In addition, as a technique for efficiently separating a slurry into a solid-content concentrated liquid and a supernatant liquid, a gravitational settling tank using a gravitational settling method has been known (for example, PTLs 2 and 3).

In the gravitational settling tank described in PTLs 2 and 3, however, the opening of the outlet of a slurry supply pipe faces downward, and the slurry gushes from the outlet. The flow of the slurry concentrates at a point, thus disadvantageously agitating the solid-content concentrated liquid settled in the lower portion of the gravitational settling tank.

As a technique attempting to solve the foregoing problem, a gravitational settling tank or the like having the effect of dispersing a slurry flow by arranging a plate member below an outlet of a slurry supply pipe has been reported.

CITATION LIST

Patent Literature

PTL 1: Japanese Unexamined Patent Application Publication No. 2009-227718
PTL 2: Japanese Unexamined Patent Application Publication No. 2007-735
PTL 3: Japanese Unexamined Patent Application Publication No. 2009-214000

SUMMARY OF INVENTION

Technical Problem

However, the foregoing gravitational settling tank including the plate member below the outlet of the slurry supply pipe has a problem in which solid matter in the slurry is deposited on the plate member. In such a gravitational settling tank, ultimately, the outlet of the slurry supply pipe seems to be clogged. The inventors have considered whether or not to install a movable device or a complicatedly structured device as a method for dispersing the flow of a slurry. However, it is difficult to install the device because of high temperature and high pressure in the gravitational settling tank.

The present invention has been accomplished in light of the foregoing circumstances. It is an object of the present invention to provide a gravitational settling tank configured to inhibit agitation of a solid-content concentrated liquid settled in the bottom due to the flow of a slurry into the gravitational settling tank, and a method for producing ash-free coal with the gravitational settling tank.

Solution to Problem

To solve the foregoing problem, a gravitational settling tank of the present invention includes a pressure vessel configured to separate a slurry in which coal and a solvent are mixed together into a solid-content concentrated liquid and a supernatant liquid by settling solid matter contained in the slurry; and a supply pipe configured to supply the pressure vessel with the slurry, in which the supply pipe includes a main body part and a nozzle part connected on the downstream side of the main body part, the nozzle part extending horizontally, and in which the nozzle part includes a plurality of holes.

In this structure, the slurry can be uniformly ejected from the plurality of holes into the pressure vessel, thus enabling the flow of the slurry to disperse. This inhibits the agitation of the solid-content concentrated liquid settled in the bottom can be inhibited.

In the present invention, the plurality of holes are preferably arranged at positions such that the slurry is ejected from the plurality of holes in an obliquely downward direction with respect to the horizontal direction.

In this structure, it is possible to achieve a substantially equal amount of the slurry effected from each of the holes, compared with, for example, the case where the plurality of holes are arranged at positions such that the slurry is ejected in a directly downward direction. Furthermore, solid matter is not deposited in the nozzles.

In the present invention, preferably, the pressure vessel has a cylindrical shape, and the nozzle part has a circular shape and is arranged along the inner wall surface of the pressure vessel.

In this structure, it is possible to uniformly arrange the plurality of holes in a horizontal plane in the pressure vessel and to more uniformly eject the slurry.

In the present invention, the nozzle part has a bent section at its end, the bent section including an upward-bent portion and a downward-bent portion located on the downstream side of the upward-bent portion, and an outlet is provided at the end of the nozzle part.

In this structure, the slurry is deposited on the upstream side of the bent section to increase the pressure in the nozzle, thereby resulting in a more uniform amount of the slurry ejected from each of the holes. The outlet is provided at the end of the nozzle part; hence, for example, even if the plurality of holes are clogged, the outlet at the end of the nozzle part serves as a vent for the slurry, thus preventing the clogging of the slurry supply pipe.

A method for producing ash-free coal according to the present invention includes a slurry preparation step of mixing coal and a solvent to prepare a slurry, an extraction step of extracting a soluble component in the solvent by heating the slurry prepared in the slurry preparation step, a separation step of separating the slurry obtained in the extraction step into a solid-content concentrated liquid and a supernatant liquid with the foregoing gravitational settling tank, and an ash-free-coal acquisition step of providing ash-free coal by separating the solvent from the supernatant liquid separated in the separation step.

According to this production method, it is possible to obtain the supernatant liquid in which solid matter is sufficiently removed in the separation step and to efficiently produce ash-free coal in which ash is sufficiently removed.

Advantageous Effects of Invention

According to the present invention, the slurry supply pipe includes the nozzle part extending in the horizontal direction, and the nozzle part includes the plurality of holes. It is thus possible to uniformly eject the slurry from the plurality of holes into the pressure vessel and to inhibit the agitation of the solid-content concentrated liquid settled in the bottom. This results in the efficient production of ash-free coal in which ash is sufficiently removed.

BRIEF DESCRIPTION OF DRAWINGS

FIG. 5 is a graph illustrating a comparison of solid concentrations in a gravitational settling tank according to the present invention and a conventional gravitational settling tank.

DESCRIPTION OF EMBODIMENTS

Figure 1:
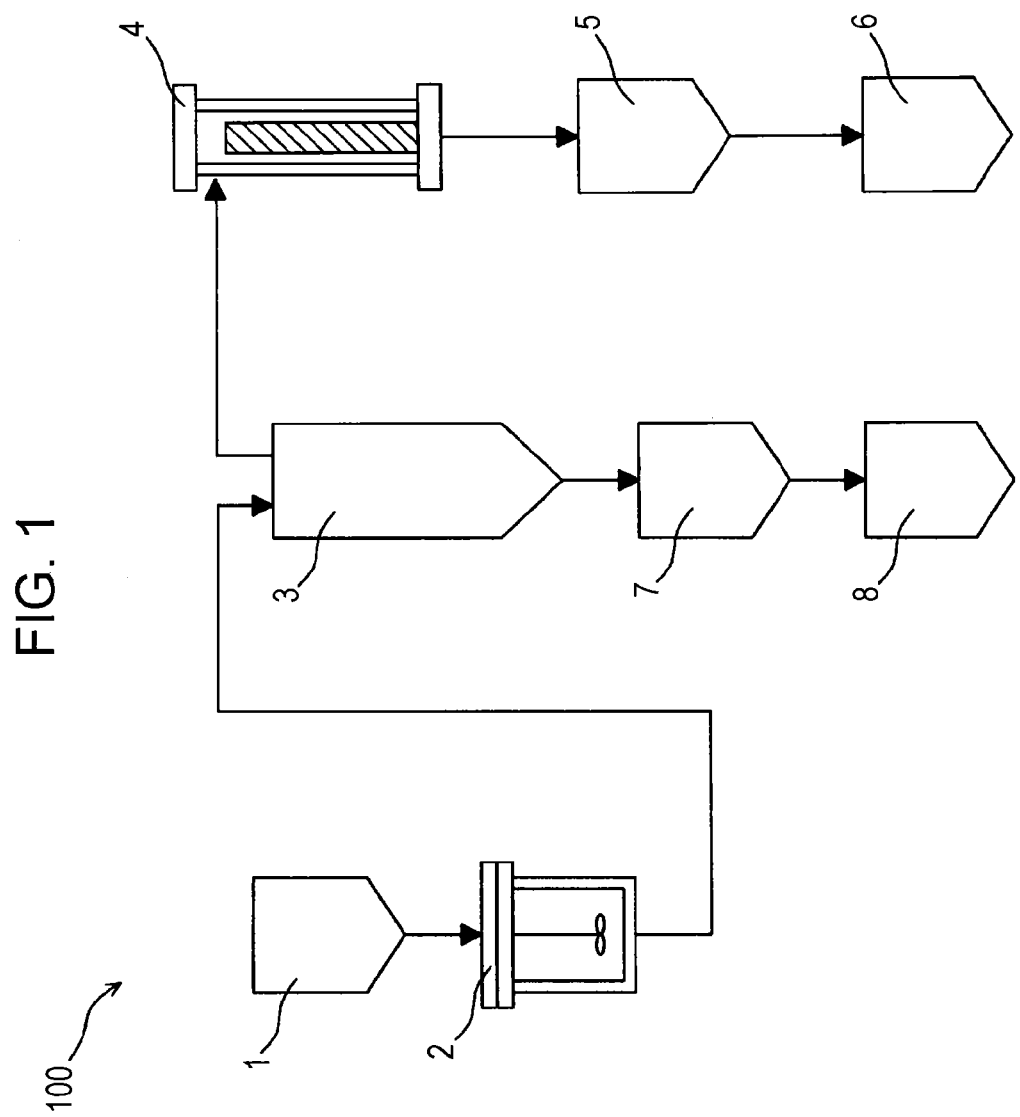
FIG. 1 is a schematic drawing illustrating an apparatus for producing ash-free coal with a gravitational settling tank according to an embodiment of the present invention.

Embodiments of the present invention will be described below with reference to the drawings. FIG. 1 is a schematic drawing illustrating an apparatus for producing ash-free coal with a gravitational settling tank according to an embodiment of the present invention.

An apparatus for producing ash-free coal 100 includes a slurry preparation tank 1, an extraction vessel 2, a gravitational settling tank 3, a filter 4, a receiver 5, a solvent recovery unit 6, a receiver 7, and a solvent recovery unit 8.

In the slurry preparation tank 1, coal and a solvent, which are raw materials, are mixed together to prepare a slurry. In the extraction vessel 2, the resulting slurry is heated to extract a soluble component in the solvent. In the gravitational settling tank 3, the slurry is separated into a solid-content concentrated liquid containing an insoluble component in the solvent and a supernatant liquid containing the soluble component in the solvent by the use of gravitational settling. In the filter 4, the supernatant liquid is filtered. In the receiver 5, the filtered supernatant liquid is temporarily stored. In the solvent recovery unit 6, the solvent is separated from the supernatant liquid to provide ash-free coal. In the receiver 7, the solid-content concentrated liquid is temporarily stored. In the solvent recovery unit 8, the solvent is separated from the solid-content concentrated liquid to provide residual coal.

The filter 4, the receiver 7, and the solvent recovery unit 8 are provided as needed and may not be provided.

Here, the insoluble component (solid content) in the solvent, the insoluble component being contained in the slurry, indicates a coal component, such as ash insoluble in the solvent and left when the coal component is extracted with the solvent, and coal (i.e., residual coal) containing the ash. The insoluble component in the solvent originates from an organic component having a developed cross-linked structure and has a relatively high molecular weight. The soluble component in the solvent indicates a coal component soluble in the solvent when coal is extracted with the solvent. The soluble component in the solvent originates from an organic component having an undeveloped cross-linked structure in coal and has a relatively low molecular weight.

Structure of Gravitational Settling Tank

Figure 2:
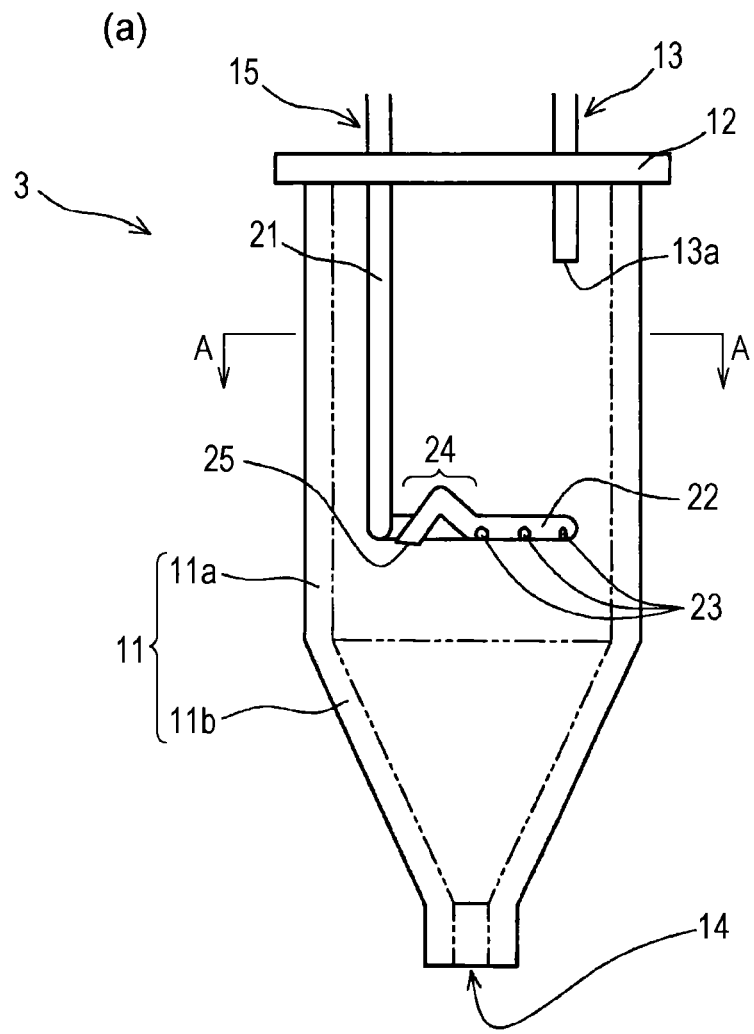
FIG. 2(a) is a front view of a gravitational settling tank according to an embodiment of the present invention, and (b) is a cross-sectional view taken along line A-A in (a).
Figure 2:
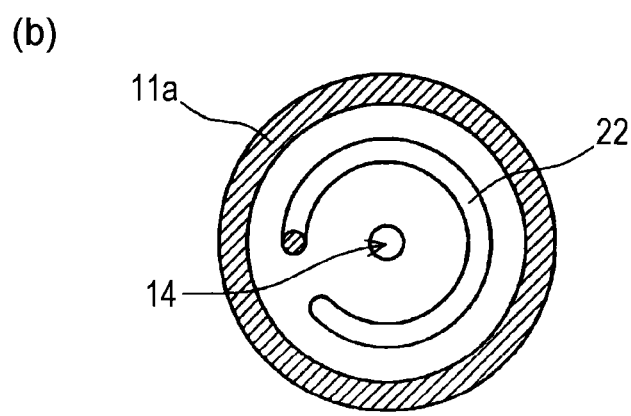
Figure 3:
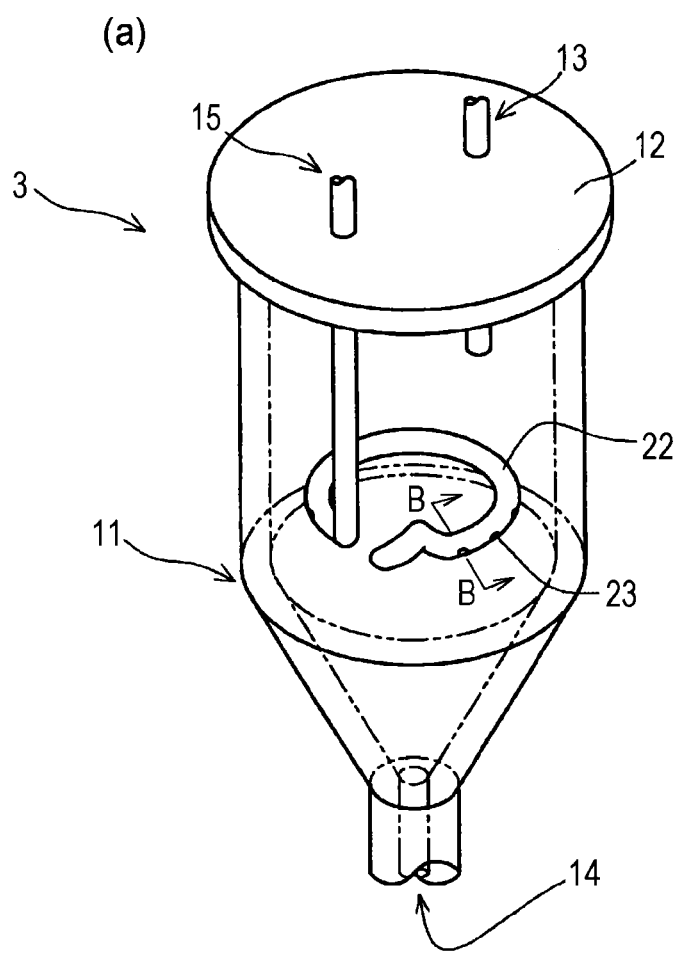
FIG. 3(a) is a perspective view of FIG. 2, and (b) is an enlarged cross-sectional view of a slurry supply pipe taken along line B-B in (a).
Figure 3:
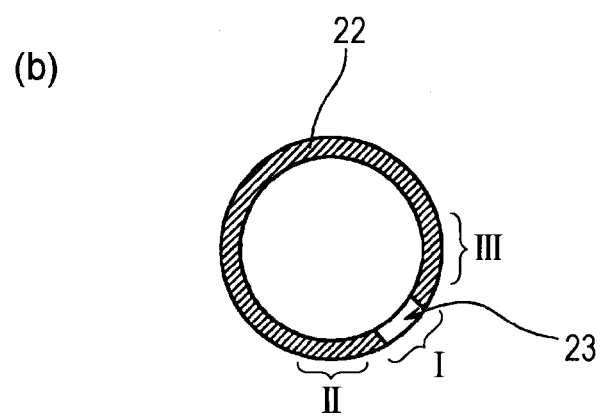

The gravitational settling tank 3 according to an embodiment of the present invention will be described below. FIG. 2(a) is a front view of a gravitational settling tank according to an embodiment of the present invention. FIG. 2(b) is a cross-sectional view taken along line A-A in (a). FIG. 3(a) is a perspective view of FIG. 2. FIG. 3(b) is an enlarged cross-sectional view of a slurry supply pipe taken along line B-B in (a). In FIGS. 2(a) and 3(a), for the sake of easy understanding of the internal structure, part of the gravitational settling tank is illustrated in perspective. As illustrated in FIG. 2(a), the gravitational settling tank 3 includes a pressure vessel 11, a lid part 12, a supernatant liquid discharge pipe 13, an outlet 14, a slurry supply pipe 15, and so forth.

Pressure Vessel

The pressure vessel 11 is a vessel configured to separate a slurry into a solid-content concentrated liquid and a supernatant liquid and includes a cylindrical body part 11a and a bottom part 11b. The bottom part 11b is arranged on the side of the lower end of the body part 11a and decreased in diameter at a lower portion. At the upper end portion of the body part 11a, the lid part 12 configured to hermetically seal the upper end portion is arranged. The body part 11a of the pressure vessel 11 is not limited to the cylindrical shape and may have another shape.

Supernatant Liquid Discharge Pipe

The supernatant liquid discharge pipe 13 is arranged to discharge a supernatant liquid accumulated in the upper portion of the pressure vessel 11 from the gravitational settling tank 3, passes through the lid part 12, and extends to the upper portion of the body part 11a. An outlet 13a is arranged at an end of the supernatant liquid discharge pipe 13. The supernatant liquid is discharged from the outlet 13a. The supernatant liquid discharge pipe 13 may be arranged so as to pass through the side wall of the body part 11a.

Outlet

The outlet 14 is arranged to discharge the solid-content concentrated liquid settling in the lower portion of the pressure vessel 11 from the gravitational settling tank 3 and located at the lowest portion of the bottom part 11b. The outlet 14 may be arranged so as to pass through the side wall of the bottom part 11b.

Slurry Supply Pipe

The slurry supply pipe 15 is arranged to supply the pressure vessel 11 with a slurry and includes a main body part 21 and a nozzle part 22. The main body part 21 passes through lid part 12 and extends to the middle portion (the lower portion of the body part 11a) in the height direction of the pressure vessel 11. The nozzle part 22 is connected to an end of the main body part 21 located on the downstream side and has a substantially circular shape, for example, a C-letter shape, so as to be substantially circled in the horizontal direction along the inner wall surface of the body part 11a (see FIG. 2(b)). The nozzle part 22 has a plurality of holes 23. As described above, the slurry supply pipe 15 has the nozzle part 22 extending in the substantially horizontal direction and the plural holes 23. It is thus possible to uniformly eject a slurry from the plural holes 23 into the pressure vessel 11 to disperse the flow of the slurry. This prevents the agitation of the solid-content concentrated liquid settled in the bottom. The nozzle part 22 has a circular shape, so the diameter of the nozzle part 22 (ejection diameter) can be easily set in response to the inside diameter of the pressure vessel 11. While the nozzle part 22 is formed integrally with the main body part 21 by bending, the nozzle part 22 may be formed by connecting pipes. The main body part 21 may pass through the side wall of the body part 11a and extend from the side wall to the inside of the pressure vessel 11.

Here, the holes 23 is preferably arranged between the outlet 13a of the supernatant liquid discharge pipe 13 and the outlet 14. If the holes 23 are located higher than the outlet 13a of the supernatant liquid discharge pipe 13, a supernatant liquid discharged from the outlet 13a has a high solid content. In this case, there are possibilities that the filter 4 is clogged early and that ash is not sufficiently removed.

As illustrated in FIG. 3(b), each of the holes 23 is arranged at an obliquely downward position in the cross section of the pipe of the nozzle part 22 (position I in FIG. 3(b)). Since each of the holes 23 is arranged at the obliquely downward position in the cross-section of the pipe of the nozzle part 22, a substantially equal amount of a slurry can be ejected from each of the holes 23. For example, if each of the holes 23 is arranged at a directly downward position in the cross section of the pipe (position II in FIG. 3(b)), a larger amount of a slurry is ejected from a hole located further upstream, and a smaller amount of the slurry is ejected from a hole located further downstream. It is thus difficult to evenly eject the slurry from all the holes 23. For example, if each of the holes 23 is arranged at a side position in the cross section of the pipe (position III in FIG. 3(b)), solid matter contained in a slurry is more likely to be gradually accumulated in the lower portion of the pipe to cause clogging.

The holes 23 are preferably arranged at regular intervals. The reason for this is that in the case where the holes 23 are arranged at regular intervals, a slurry can be more uniformly ejected into the pressure vessel 11. In the case where the number of the holes 23 is increased and where the opening area of each of the holes 23 is reduced, the effect of dispersing the flow of the slurry is further increased. In this embodiment, the holes 23 are arranged on the outside of the nozzle part 22 (see FIG. 3(a)). However, whether openings of the holes 23 are directed inwardly or outwardly can be appropriately selected in view of, for example, the positional relationship between the inner wall surface of the pressure vessel 11 and the nozzle part 22 and the shape of the nozzle part 22. The mixture of a hole with an inwardly facing opening and a hole with an outwardly facing opening is acceptable.

An end portion of the nozzle part 22 has a bent section 24 formed by bending the pipe upward and then downward. This structure results in the accumulation of a slurry on the upstream side of the bent portion 24 to increase the pressure in the nozzle part 22 and thus achieves a more uniform amount of the slurry ejected from the plural holes 23. An outlet 25 is provided at an end of the nozzle part 22. The opening of the outlet 25 faces downward. In this structure, for example, even if the plural holes 23 are clogged, the outlet 25 serves as a vent for the slurry, thus preventing the clogging of the slurry supply pipe 15. The bent section 24 and the outlet 25 may be provided as needed and may not be provided.

To prevent the reprecipitation of the soluble component in the solvent, the inside of the pressure vessel 11 is preferably heated and pressurized with, for example, a heating means and a pressurizing means (not illustrated). The heating temperature is preferably in the range of 300° C. to 420° C. The pressure is preferably in the range of about 1.0 to about 3.0 MPa and more preferably 1.7 to 2.3 MPa.

Figure 4:
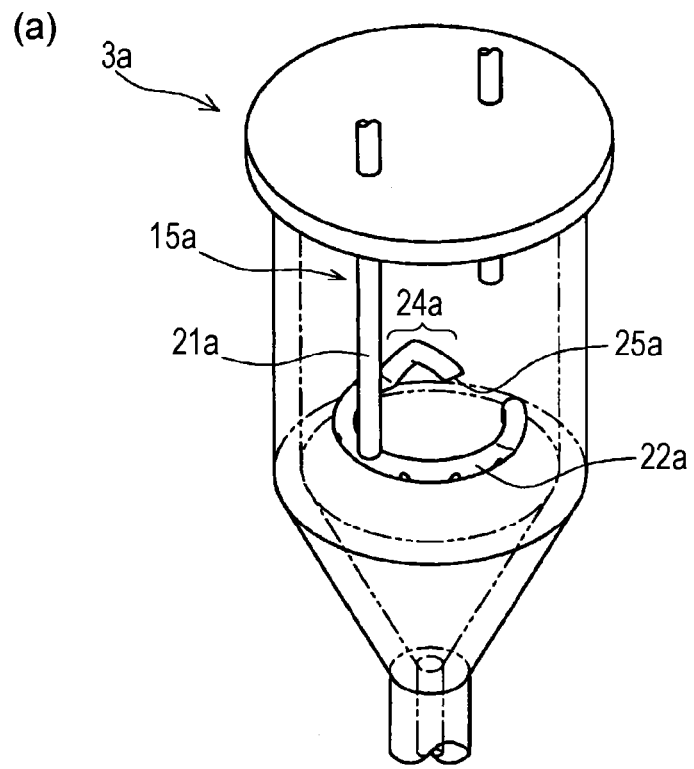
FIGS. 4(a) and (b) are perspective views of gravitational settling tanks according to modified embodiments of the present invention.
Figure 4:
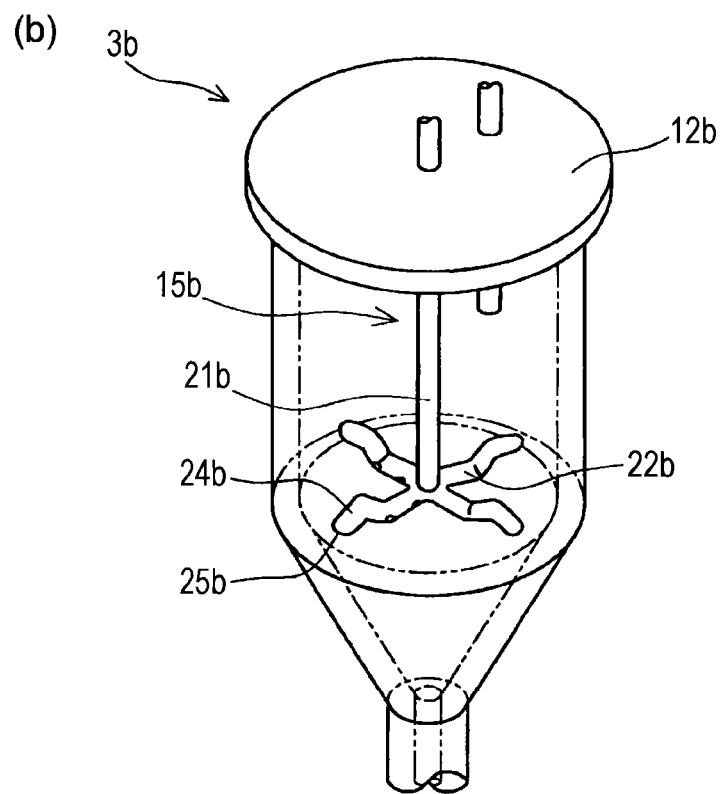

Modified Embodiment (a) and (b) in FIG. 4 are perspective views of gravitational settling tanks according to modified embodiments of the present invention. Slurry supply pipes different in shape from that in the foregoing embodiment are provided. In each of (a) and (b) in FIG. 4, for the sake of easy understanding of the internal structure, part of the gravitational settling tank 3 is illustrated in perspective. In a gravitational settling tank 3a illustrated in FIG. 4(a), nozzle parts 22a are arranged so as to be divided into two directions from an end of a main body part 21a of a slurry supply pipe 15a. A bent portion 24a and an outlet 25a are provided at an end portion of each of the nozzle parts 22a. Each of the two outlets 25a is located at a position distant from the end of the main body part 21a by almost half the circumference. In a gravitational settling tank 3b illustrated in FIG. 4(b), a main body part 21b of a slurry supply pipe 15b is arranged so as to pass roughly through the center of a lid part 12b. Nozzle parts 22b extend radially from an end of the main body part 21b in four directions. A bent portion 24b and a hole (outlet) 25b are provided at an end portion of each of the nozzle parts 22b. The nozzle parts 22b are not limited to the structure in which they extend in four directions. The nozzle parts 22b may not extend radially.

Method for Producing Ash-Free Coal

A method for producing ash-free coal will be described below. The method for producing ash-free coal according to the present invention includes a slurry preparation step, an extraction step, a separation step, and an ash-free-coal acquisition step, and, if necessary, further includes a residual-coal acquisition step.

Slurry Preparation Step

The slurry preparation step is a step of mixing coal and a solvent to prepare a slurry and is performed with the slurry preparation tank 1. As a coal feedstock, coal with a wide variety of qualities may be used. Examples of the coal feedstock that may be preferably used include bituminous coal, subbituminous coal, and lignite.

A solvent is not particularly limited as long as it dissolves coal. A bicyclic aromatic compound originating from coal is preferably used. The bicyclic aromatic compound is similar in basic structure to the molecular structure of coal and thus has a high affinity for coal. In the case where the bicyclic aromatic compound is used as a solvent, a relatively high extraction rate can be achieved. Examples of the bicyclic aromatic compound originating from coal include methylnaphthalene oil and naphthalene oil, which are distillate oils of by-product oil obtained when coal is subjected to carbonization to produce coke.

The boiling point of the solvent is not particularly limited. In view of, for example, the extraction rate in the extraction step and the solvent recovery rate in the ash-free-coal acquisition step, a solvent having a boiling point of 180° C. to 300° C., particularly 230° C. to 280° C. is preferably used.

The concentration of the coal feedstock with respect to the solvent is not particularly limited and is, on a dry coal basis, preferably in the range of 10% to 50% by weight and more preferably 15% to 35% by weight.

Extraction Step

The extraction step is a step of extracting the soluble component in the solvent by heating the slurry prepared in the slurry preparation step and is performed with the extraction vessel 2. The slurry prepared in the slurry preparation tank 1 is fed to the extraction vessel 2 with, for example, a pump. The slurry is heated and maintained at a predetermined temperature under stirring with a stirrer attached to the extraction vessel 2. In this way, extraction is performed. Alternatively, after the slurry is temporarily fed to a preheater (not illustrated) and then heated to the predetermined temperature, the slurry may be fed to the extraction vessel 2.

The heating temperature in the extraction step is not particularly limited as long as the soluble component in the solvent is dissolved. The heating temperature is preferably in the range of 300° C. to 420° C. and more preferably 350° C. to 400° C. from the viewpoint of, for example, achieving sufficient extraction of the soluble component in the solvent. The heating time (extraction time) is not particularly limited and is preferably in the range of 5 to 60 minutes and more preferably 20 to 40 minutes from the viewpoint of achieving sufficient dissolution and the extraction rate. In the case where the slurry is temporarily heated with the preheater (not illustrated), the heating time indicates the total heating time of the heating time with the preheater and the heating time in the extraction vessel 2.

The extraction step is preferably performed in the presence of an inert gas. Nitrogen, which is inexpensive, is preferably used therefor. The pressure in the extraction step is preferably in the range of 1.0 to 2.0 MPa, depending on the temperature during extraction and the vapor pressure of a solvent used.

Separation Step

The separation step is a step of separating the slurry obtained in the extraction step into a solid-content concentrated liquid and a supernatant liquid with the foregoing gravitational settling tank 3. The supernatant liquid is a solution containing the soluble component in the solvent. The solid-content concentrated liquid is a slurry containing the insoluble component in the solvent. In the separation step, the foregoing gravitational settling tank 3 is used, thereby providing a supernatant liquid in which solid matter is sufficiently removed. The supernatant liquid discharged from the gravitational settling tank 3 is filtered through the filter 4, temporarily stored in the receiver 5, and fed into the solvent recovery unit 6. The solid-content concentrated liquid is temporarily stored in the receiver 7 and fed to the solvent recovery unit 8.

Ash-Free-Coal Acquisition Step

The ash-free-coal acquisition step is a step of providing ash-free coal by separating the solvent from the supernatant liquid separated in the separation step and is performed with the solvent recovery unit 6.

As a method for separating the solvent from the supernatant liquid, a common distillation method, an evaporation method (for example, a spray-dry method), or the like may be employed. The separated and recovered solvent may be repeatedly used by being returned to the slurry preparation tank 1. The ash-free coal has an ash concentration of 3% or less, contains little ash, no water, and, for example, has a higher heating value than coking coal. Furthermore, the ash-free coal has markedly improved plastic properties, which are a particularly important quality, as a material of coke for steelmaking and thus, for example, exhibits far superior performance (flowability) to coking coal. Therefore, the ash-free coal may be used as blended coal for a raw material for coke. The ash-free coal may also be used as blended coal by mixing with residual coal described below.

Residual Coal Acquisition Step

The residual coal acquisition step is a step of providing residual coal by separating the solvent from the solid-content concentrated liquid separated in the separation step and is performed with the solvent recovery unit 8, as needed.

As a method for separating the solvent from the supernatant liquid, a common distillation method, an evaporation method, or the like may be employed in the same way as in the foregoing ash-free-coal acquisition step. The separated and recovered solvent may be repeatedly used by being returned to the slurry preparation tank 1. The separation and recovery of the solvent from the solid-content concentrated liquid result in residual coal in which insoluble components in the solvent, the insoluble components containing ash and so forth, are concentrated. The residual coal contains ash, no water, and has a sufficient heating value. The residual coal does not have plastic properties. However, an oxygen-containing functional group is removed from the residual coal. Thus, in the case where the residual coal is used as blended coal, the plastic properties of another type of coal in the blended coal are not inhibited. Hence, the residual coal may be used as part of blended coal for a raw material for coke in the same way as common non- or slightly-caking coal. Furthermore, the residual coal may be used as a fuel for various applications in place of the raw material for coke. The residual coal may be discarded without recovery.

Effect

In the method for producing ash-free coal according to the present invention, the use of the foregoing gravitational settling tank 3 results in a supernatant liquid in which solid matter is sufficiently removed, thereby efficiently producing ash-free coal. Furthermore, it is possible to prevent the clogging of the filter 4 at an early stage.

The method for producing ash-free coal according to the present invention has been described above. However, in the case of performing the present invention, the method may include other steps, such as a coal-crushing step of crushing a coal feedstock, a removal step of removing undesired substances, e.g., contaminants, and a drying step of drying the resulting ash-free coal, between the steps, before the steps, or after the steps to the extent that the foregoing steps are not adversely affected.

EXAMPLES

To check a gravitational settling tank according to the present invention, an experiment was conducted with a gravitational settling tank having the same structure as the gravitational settling tank 3 according to the present invention illustrated in FIG. 1 and a conventional gravitational settling tank. In this experiment, solid concentration distributions in pressure vessels of the two gravitational settling tanks are measured and compared with each other after separation into solid matter and a supernatant liquid.

Bituminous coal is used as a coal feedstock. Methylnaphthalene H (C-Chem Co., Ltd)) is used as a solvent. The coal and the solvent is mixed together to prepare a slurry. The concentration of the coal feedstock with respect to the solvent is 19.5% by weight on a dry coal basis. The slurry was heated to 400° C. and pressurized to 2.0 MPa to extract a soluble component in the solvent for 20 minutes. The slurry was fed to the gravitational settling tank that was maintained at 350° C. and 2.0 MPa, and separated into a solid-content concentrated liquid and a supernatant liquid. As the pressure vessel, a pressure vessel having the same structure as the pressure vessel 11 illustrated in FIG. 2 is used. As a slurry supply pipe, two types of slurry supply pipes are used: linear slurry supply pipe A used in the conventional gravitational settling tank and slurry supply pipe B having the same structure as the slurry supply pipe 15 illustrated in FIG. 2. Here, slurry supply pipe A has only a hole (outlet) at its end, whereas slurry supply pipe B has a plurality of holes (outlets) in a nozzle part. Each of slurry supply pipes A and B extends to height $H_0 \times 0.6$ where $H_0$ represents the height of the pressure vessel.

FIG. 5 illustrates the measurement results of the solid concentrations in the pressure vessel while the slurry is being fed after the slurry is fed to the pressure vessel for 40 hours. H represents the height of the measurement position above the lowermost portion of the pressure vessel. The measurement was performed twice (n=2) for each of slurry supply pipes A and B.

In the case of using slurry supply pipe A, in the uppermost portion ($H/H_0$=1) of the pressure vessel, the solid concentration was as high as about 5% by weight, and the clarification of the supernatant liquid did not proceed. On the lower side (for example, $H/H_0$=0.2) of the pressure vessel, the solid concentration was about 10% by weight, and the concentration of the solid matter did not proceed. These results demonstrated that in the conventional gravitational settling tank with slurry supply pipe A, the solid matter and the supernatant liquid were not clearly separated.

In contrast, in the case of using slurry supply pipe B, in the uppermost portion ($H/H_0$=1) of the pressure vessel, the solid concentration was as low as about 0.5% by weight, and the supernatant liquid was 10 times clearer than that of the case of using slurry supply pipe A. In addition, the solid concentration was steeply increased approximately in the middle portion ($H/H_0$=0.4) of the pressure vessel and was maintained at a high level to the lowermost portion of the pressure vessel. These results demonstrated that in the gravitational settling tank including slurry supply pipe B according to the present invention, the solid matter and the supernatant liquid were efficiently separated from each other.

While the embodiments of the present invention have been described above, the present invention is not limited to the foregoing embodiments. Various modifications may be made within the scope of the claims.

In each of the gravitational settling tanks described in the embodiment and the modified embodiments, a single slurry supply pipe is used. However, a plurality of slurry supply pipes may be used.

This application claims the benefit of Japanese Patent Application No. 2011-138094, filed Jun. 22, 2011, which is hereby incorporated by reference herein in its entirety.

REFERENCE SIGNS LIST 1 slurry preparation tank
2 extraction vessel
3 gravitational settling tank
4 filter
5, 7 receiver
6, 8 solvent recovery unit
11 pressure vessel
12 lid part
13 supernatant liquid discharge pipe
14 outlet
15 slurry supply pipe
21 main body part
22 nozzle part
23 hole
24 bent section
25 outlet
100 apparatus for producing ash-free coal

The invention claimed is:

1. A gravitational settling tank comprising a pressure vessel configured to separate a slurry in which coal and a solvent are mixed together into a solid-content concentrated liquid and a supernatant liquid by settling solid matter contained in the slurry; and a supply pipe configured to supply the pressure vessel with the slurry, wherein the supply pipe includes a main body part and a nozzle part connected on the downstream side of the main body part, the nozzle part extending horizontally, and wherein the nozzle part includes a plurality of holes, wherein the nozzle part has a bent section at its end, the bent section including an upward-bent portion and a downward-bent portion located on the downstream side of the upward-bent portion.

2. The gravitational settling tank according to claim 1, wherein the plurality of holes are arranged at positions such that the slurry is ejected from the plurality of holes in an obliquely downward direction with respect to the horizontal direction.

3. The gravitational settling tank according to claim 1, wherein the pressure vessel has a cylindrical shape, and the nozzle part has a circular shape and is arranged along the inner wall surface of the pressure vessel.

4. The gravitational settling tank according to claim 1, wherein an outlet is provided at the end of the nozzle part.

* * * * *